United States Patent
Takahashi

(10) Patent No.: US 10,460,405 B2
(45) Date of Patent: Oct. 29, 2019

(54) SERVER AND METHOD FOR TIMELY ADJUSTING PRICE OF A PLAN VOUCHER

(71) Applicant: Rakuten, Inc., Tokyo (JP)

(72) Inventor: Naoki Takahashi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 525 days.

(21) Appl. No.: 15/125,876

(22) PCT Filed: Sep. 29, 2014

(86) PCT No.: PCT/JP2014/075865
§ 371 (c)(1),
(2) Date: Sep. 13, 2016

(87) PCT Pub. No.: WO2016/051457
PCT Pub. Date: Apr. 7, 2016

(65) Prior Publication Data
US 2017/0018043 A1 Jan. 19, 2017

(51) Int. Cl.
*G06Q 50/14* (2012.01)
*G06Q 10/02* (2012.01)
*G06Q 30/02* (2012.01)
*G06Q 30/06* (2012.01)

(52) U.S. Cl.
CPC ............ *G06Q 50/14* (2013.01); *G06Q 10/02* (2013.01); *G06Q 30/0258* (2013.01); *G06Q 30/06* (2013.01)

(58) Field of Classification Search
CPC .... G06Q 50/14; G06Q 10/02; G06Q 30/0258; G06Q 30/06
See application file for complete search history.

(56) References Cited

U.S. PATENT DOCUMENTS

| 7,472,080 B2 * | 12/2008 | Goel | G06Q 10/02 705/26.43 |
| 7,548,615 B2 * | 6/2009 | Bhalgat | G06Q 10/00 379/114.14 |
| 2005/0119980 A1 * | 6/2005 | Kohavi | G06Q 10/02 705/80 |

(Continued)

FOREIGN PATENT DOCUMENTS

JP 2004-192357 A 7/2004

OTHER PUBLICATIONS

Green, Cindy Estis., and Mark V. Lomanno. Distribution Channel Analysis: a Guide for Hotels. HSMAI Foundation, 2012. <https://clients.theygsgroup.com/hsmai-uploads/DCAbook_Full.pdf> Reterived on Feb. 28, 2019).*

(Continued)

*Primary Examiner* — Daniel Vetter
*Assistant Examiner* — Manal A. Alsamiri
(74) *Attorney, Agent, or Firm* — Sughrue Mion, PLLC

(57) ABSTRACT

When detecting a reduction in the price of an airline ticket included in an airline ticket and plan voucher combination that does not meet any set of desired purchase conditions specified by users, a set item providing server SA notifies information to prompt reduction in the price of a plan voucher included in a combination that fails to satisfy any set of desired purchase conditions that has no hits, among combinations of the marked-down airline ticket and a plan voucher, to the facility provider that provides the plan voucher.

12 Claims, 6 Drawing Sheets

(56) References Cited

U.S. PATENT DOCUMENTS

2006/0241984 A1* 10/2006 Godin ................... G06Q 10/00
                                                            705/5
2014/0279172 A1*  9/2014 Walker .................. G06Q 10/02
                                                            705/26.4

OTHER PUBLICATIONS

International Search Report of PCT/JP2014/075865, dated Nov. 25, 2014. [PCT/ISA/210].

* cited by examiner

FIG.3A

COMBINATION DATABASE 25

| No. | AIRLINE TICKET | PLAN VOUCHER | HITS |
|---|---|---|---|
| 1 | A1000 | F131 | 0 |
| 2 | A1001 | F132 | 0 |
| 3 | A1002 | F133 | 0 |
| 4 | A1003 | F152 | 1 |
| 5 | A1004 | F153 | 1 |
| 6 | A1005 | F165 | 0 |
| 7 | A1006 | F166 | 0 |
| 8 | A1007 | F177 | 0 |
| 9 | A1008 | F178 | 0 |
| 10 | A1009 | F179 | 0 |
| ... | ... | ... | ... |

FIG.3B

DESIRED PURCHASE CONDITIONS DATABASE 26

| No. | RECEPTION DATE AND TIME | USER ID | BUDGET | PEOPLE WHO WILL USE | DESIRED PURCHASE CONDITIONS - DEPARTURE DATE | END DATE | PLACE OF DEPARTURE | DESTINATION | HITS | SALES |
|---|---|---|---|---|---|---|---|---|---|---|
| 1 | 5/25 9:03 | U0001 | 70,000 | 2 | 6/1 | 6/2 | TOKYO | KUSHIRO | 0 | 0 |
| 2 | 5/25 10:00 | U0002 | 50,000 | 1 | 6/1 | 6/2 | TOKYO | KUSHIRO | 0 | 0 |
| 3 | 5/25 10:03 | U0001 | 75,000 | 2 | 6/1 | 6/2 | TOKYO | KUSHIRO | 0 | 0 |
| 4 | 5/25 10:04 | U0001 | 80,000 | 2 | 6/1 | 6/2 | TOKYO | KUSHIRO | 0 | 0 |
| 5 | 5/26 11:04 | U0003 | 100,000 | 2 | 6/1 | 6/2 | TOKYO | KUSHIRO | 1 | 1 |
| 6 | 5/26 12:05 | U0004 | 70,000 | 2 | 6/1 | 6/2 | TOKYO | NAHA | 0 | 0 |
| 7 | 5/26 12:05 | U0004 | 75,000 | 2 | 6/1 | 6/2 | TOKYO | NAHA | 0 | 0 |
| 8 | 5/27 10:05 | U0005 | 85,000 | 2 | 6/1 | 6/2 | TOKYO | IZUMO | 1 | 1 |
| 9 | 5/28 10:05 | U0006 | 75,000 | 2 | 6/1 | 6/2 | TOKYO | KUSHIRO | 0 | 0 |
| 10 | 5/28 13:05 | U0007 | 40,000 | 1 | 6/1 | 6/2 | TOKYO | KUSHIRO | 0 | 0 |
| 11 | 5/28 14:04 | U0001 | 92,000 | 2 | 6/1 | 6/2 | TOKYO | KUSHIRO | 1 | 1 |
| 12 | 5/29 15:05 | U0008 | 75,000 | 2 | 6/1 | 6/2 | TOKYO | IZUMO | 0 | 0 |
| 13 | 5/30 14:05 | U0009 | 40,000 | 1 | 6/1 | 6/2 | TOKYO | KUSHIRO | 0 | 0 |
| ... | ... | ... | ... | ... | ... | ... | ... | ... | ... | ... |

FIG. 6A

| BUDGET | USERS |
|---|---|
| 80,000 | 20 |
| 75,000 | 40 |
| 70,000 | 70 |
| 68,000 | 100 |
| 65,000 | 160 |
| 62,000 | 40 |
| 60,000 | 20 |
| 50,000 | 40 |
| 40,000 | 10 |
| TOTAL USERS → | 500 |

FIG. 6B

| BUDGET | USERS | AIRLINE TICKET BUDGET | AIRLINE TICKETS IN STOCK |
|---|---|---|---|
| 80,000 | 20 | 30,000 | 1000 |
| 75,000 | 40 | 25,000 | 800 |
| 70,000 | 70 | 20,000 | 400 |
| 68,000 | 100 | 18,000 | 200 |
| 65,000 | 160 | 15,000 | 50 |
| 62,000 | 40 | 12,000 | 0 |
| 60,000 | 20 | 10,000 | 0 |
| 50,000 | 40 | 0 | 0 |
| 40,000 | 10 | −100,000 | 0 |
| TOTAL USERS → | 500 | | |

FIG. 6C

| BUDGET | USERS | AIRLINE TICKET BUDGET | AIRLINE TICKETS IN STOCK | ESTIMATED POTENTIAL USERS |
|---|---|---|---|---|
| 80,000 | 20 | 30,000 | 1000 | 20 |
| 75,000 | 40 | 25,000 | 800 | 60 |
| 70,000 | 70 | 20,000 | 400 | 130 |
| 68,000 | 100 | 18,000 | 200 | 230 |
| 65,000 | 160 | 15,000 | 50 | 390 |
| 62,000 | 40 | 12,000 | 0 | 430 |
| 60,000 | 20 | 10,000 | 0 | 450 |
| 50,000 | 40 | 0 | 0 | 490 |
| 40,000 | 10 | −100,000 | 0 | 500 |
| TOTAL USERS → | 500 | | | |

FIG. 6D

| BUDGET | USERS | ACTIVE USERS | AIRLINE TICKET BUDGET | AIRLINE TICKETS IN STOCK | ESTIMATED POTENTIAL USERS |
|---|---|---|---|---|---|
| 80,000 | 20 | 8 | 30,000 | 1000 | 8 |
| 75,000 | 40 | 25 | 25,000 | 800 | 33 |
| 70,000 | 70 | 55 | 20,000 | 400 | 88 |
| 68,000 | 100 | 80 | 18,000 | 200 | 168 |
| 65,000 | 160 | 130 | 15,000 | 50 | 298 |
| 62,000 | 40 | 40 | 12,000 | 0 | 338 |
| 60,000 | 20 | 5 | 10,000 | 0 | 343 |
| 50,000 | 40 | 2 | 0 | 0 | 345 |
| 40,000 | 10 | 0 | −100,000 | 0 | 345 |
| TOTAL USERS → | 500 | 345 | | | |

FIG. 6E

| BUDGET | USERS | USERS WHO GIVE FIRST CHOICE | AIRLINE TICKET BUDGET | AIRLINE TICKETS IN STOCK | ACCOMMODATION PLANS IN STOCK | ESTIMATED POTENTIAL USERS |
|---|---|---|---|---|---|---|
| 80,000 | 20 | 2 | 30,000 | 1000 | 30 | 2 |
| 75,000 | 40 | 7 | 25,000 | 800 | 30 | 9 |
| 70,000 | 70 | 11 | 20,000 | 400 | 30 | 20 |
| 68,000 | 100 | 25 | 18,000 | 200 | 30 | 45 |
| 65,000 | 160 | 20 | 15,000 | 50 | 30 | 65 |
| 62,000 | 40 | 5 | 12,000 | 0 | 30 | 70 |
| 60,000 | 20 | 0 | 10,000 | 0 | 30 | 70 |
| 50,000 | 40 | 0 | 0 | 0 | 30 | 70 |
| 40,000 | 10 | 0 | −100,000 | 0 | 30 | 70 |
| TOTAL USERS → | 500 | 70 | | | | |

SERVER AND METHOD FOR TIMELY ADJUSTING PRICE OF A PLAN VOUCHER

CROSS REFERENCE TO RELATED APPLICATIONS

This application is a National Stage of International Application No. PCT/JP2014/075865 filed Sep. 29, 2014, the contents of all of which are incorporated herein by reference in their entirety.

TECHNICAL FIELD

The present invention relates to techniques, including systems, for providing users with a transportation and facility combination.

BACKGROUND ART

A system that provides a user with a combination of transportation (e.g., an airplane) and a facility (e.g., an accommodation facility) that satisfies desired conditions specified by the user is conventionally known. For example, Patent Literature 1 discloses a system that allows for searches and reservations using a plurality of systems of transportation and accommodation facilities with a common ID and password, without sequentially repeating, at each system, login via an authentication process and logout after searches and reservations.

CITATION LIST

Patent Literature

Patent Literature 1: JP 2004-192357 A

SUMMARY OF INVENTION

Technical Problem

For example, when such a set item as described above that is a combination of a transportation-related item (e.g., an airline ticket) and a facility-related item has been unsold because it does not meet any user's desired purchase conditions, the provider (e.g., an airline) that provides the transportation-related item may reduce the price of the item at a desired timing to prevent the item from remaining unsold. Even in such a case, although a little more reduction in the price satisfies a user's desired purchase conditions, the above set item may still remain unsold. This is a loss for the provider (e.g., a facility provider such as the manager of an accommodation facility) that provides the facility-related item. In the conventional system, it is difficult for the facility provider to timely reduce the price of the facility-related item in step with a reduction in the price of the transportation-related item.

Therefore, in view of, for example, the above point, it is an object of the present invention to provide an information processing device, an information processing method, and an information processing program that allows a facility provider to be timely prompted to reduce the price of the facility-related item in step with a reduction in the price of a transportation-related item.

Solution to Problem

To solve the above problem, the invention according to claim 1 includes first registering means, second registering means, obtaining means, and notification means. The first registering means registers first items each indicating at least a transportation fare. The second registering means registers second items each indicating at least a facility plan charge. The obtaining means obtains sets of desired purchase conditions. Each set indicates at least a budget specified by a user. When a reduction in a fare indicated by the first item included in a combination of a first item registered by the first registering means and a second item registered by the second registering means that satisfies none of the sets of desired purchase conditions obtained by the obtaining means is detected, the notification means notifies information to prompt reduction in a charge indicated by the second item included in a combination that fails to satisfy any of the sets of desired purchase conditions, among combinations of the first item whose fare has been reduced and the second item, to a provider of the second item.

This invention allows the provider of a second item to be timely prompted to reduce the price of the second item in step with a reduction in the price of a first item.

The invention according to claim 2 is the information processing device according to claim 1 that further includes first identifying means. A combination of the first item whose fare has been reduced and the second item fails to satisfy a budget indicated by any one of the sets of desired purchase conditions. The first identifying means identifies, for each of a plurality of budget levels, how many users specified a budget indicated by one of the sets of desired purchase conditions. The notification means notifies information associating, for each budget level, the number of users identified by the first identifying means with the budget level as the information to prompt reduction in the charge to the provider of the second item.

This invention allows the provider of a second item to be provided with information useful for determining how much to reduce the price.

The invention according to claim 3 is the information processing device according to claim 1 or 2 that further includes second identifying means. A combination of the first item whose fare has been reduced and the second item fails to satisfy a budget indicated by any one of the sets of desired purchase conditions. The second identifying means identifies how many users specified a budget indicated by one of the sets of desired purchase conditions more than once. The notification means notifies information associating, for each budget level, the number of users identified by the second identifying means with the budget level as the information to prompt reduction in the charge to the provider of the second item.

This invention allows the provider of a second item to be provided with information useful for determining how much to reduce the price.

The invention according to claim 4 is the information processing device according to claim 1 or 2 that further includes second identifying means. A combination of the first item whose fare has been reduced and the second item fails to satisfy a budget indicated by any one of the sets of desired purchase conditions. The second identifying means identifies how many users specified a budget indicated by one of the sets of desired purchase conditions a predetermined number of times or more within a predetermined period of time. The notification means notifies information associating, for each budget level, the number of users identified by the second identifying means with the budget level as the information to prompt reduction in the charge to the provider of the second item.

This invention allows the provider of a second item to be provided with information useful for determining how much to reduce the price.

The invention according to claim 5 is the information processing device according to any one of claims 1 to 4 that further includes third identifying means. A combination of the first item whose fare has been reduced and the second item fails to satisfy a budget indicated by any one of the sets of desired purchase conditions. The third identifying means identifies how many users viewed an item provided by a specific provider, among users who specified a budget indicated by one of the sets of desired purchase conditions. The notification means notifies information associating, for each budget level, the number of users identified by the third identifying means with the budget level as the information to prompt reduction in the charge to the specific provider.

This invention allows the provider of a second item to be provided with information useful for determining how much to reduce the price.

The invention according to claim 6 is the information processing device according to any one of claims 2 to 5 in which the notification means notifies information associating, for each budget, the number of users identified by the identifying means and the number of stocks of the first item included in a combination that fails to satisfy any of the sets of desired purchase conditions with the budget level as the information to prompt reduction in the charge to the provider of the second item.

This invention allows the provider of a second item to be provided with information useful for determining how much to reduce the price.

The invention according to claim 7 is the information processing device according to any one of claims 2 to 6 in which only when the number of users identified by the identifying means is less than or equal to a threshold value, the notification means notifies the information to prompt reduction in the charge to the provider.

This invention allows notification to the provider of a second item to be limited. Consequently, the load on a server and the load on a network can be reduced.

The invention according to claim 8 is the information processing device according to any one of claims 2 to 6 in which only when an occupancy rate of the facility is less than or equal to a threshold value, the notification means notifies the information to prompt reduction in the charge to the provider.

This invention allows notification to the provider of a second item to be limited. Consequently, the load on a server and the load on a network can be reduced.

The invention according to claim 9 is the information processing device according to any one of claims 2 to 6 in which only when an occupancy rate of the facility is less than an occupancy rate of the competing provider, the notification means notifies the information to prompt reduction in the charge to the provider.

This invention allows notification to the provider of a second item to be limited. Consequently, the load on a server and the load on a network can be reduced.

The invention according to claim 10 is the information processing device according to any one of claims 2 to 6 in which only when the number of stocks of the first item included in a combination that fails to satisfy any of the sets of desired purchase conditions, among combinations of the first item whose fare has been reduced and the second item, is less than or equal to a threshold value, the notification means notifies the information to prompt reduction in the charge to the provider.

This invention allows notification to the provider of a second item to be limited. Consequently, the load on a server and the load on a network can be reduced.

The invention according to claim 11 is an information processing method performed by a computer. The method includes the following steps. First items each indicating at least a transportation fare are registered. Second items each indicating at least a facility plan charge are registered. Sets of desired purchase conditions are obtained. Each set indicates at least a budget specified by a user. When a reduction in a fare indicated by the first item included in a combination of a registered first item and a registered second item that satisfies none of the obtained sets of desired purchase conditions is detected, information to prompt reduction in a charge indicated by the second item included in a combination that fails to satisfy any of the sets of desired purchase conditions, among combinations of the first item whose fare has been reduced and the second item, is notified to a provider of the second item.

The invention according to claim 12 causes a computer to function as first registering means, second registering means, obtaining means, and notification means. The first registering means registers first items each indicating at least a transportation fare. The second registering means registers second items each indicating at least a facility plan charge. The obtaining means obtains sets of desired purchase conditions. Each set indicates at least a budget specified by a user. When a reduction in a fare indicated by the first item included in a combination of a first item registered by the first registering means and a second item registered by the second registering means that satisfies none of the sets of desired purchase conditions obtained by the obtaining means is detected, the notification means notifies information to prompt reduction in a charge indicated by the second item included in a combination that fails to satisfy any of the sets of desired purchase conditions, among combinations of the first item whose fare has been reduced and the second item, to a provider of the second item.

Advantageous Effects of Invention

The present invention allows a facility provider to be timely prompted to reduce the price of the facility-related item in step with a reduction in the price of a transportation-related item.

BRIEF DESCRIPTION OF DRAWINGS

FIG. 3A is a diagram showing an example of information stored in a combination database 25.

FIG. 3B is a diagram showing an example of information stored in a desired purchase conditions database 26.

FIG. 6A is a diagram showing an example of association information associating, for each budget level, the number of users with the budget level.

FIG. 6B is a diagram showing an example of association information associating, for each budget level, the number of users, an airline ticket budget, and the number of airline tickets in stock with the budget level.

FIG. 6C is a diagram showing an example of association information associating, for each budget level, the number of users, an airline ticket budget, the number of airline tickets in stock, and the estimated number of potential users with the budget level.

FIG. 6D is a diagram showing an example of association information associating, for each budget level, the number of users, the number of active users among the users, an airline ticket budget, the number of airline tickets in stock, and an estimated number of potential users with the budget level.

FIG. 6E is a diagram showing an example of association information associating, for each budget level, the number of users, the number of users who give first choice to a target accommodation facility among the users, an airline ticket budget, the number of airline tickets in stock, the number of accommodation plans in stock that are provided by the target accommodation facility, and an estimated number of potential users with the budget level.

DESCRIPTION OF EMBODIMENTS

The following describes an embodiment of the present invention with reference to the drawings. In the embodiment described below, the present invention is applied to a set item providing system.

1. Configuration and Functional Overview of Set Item Providing System

Figure 1:
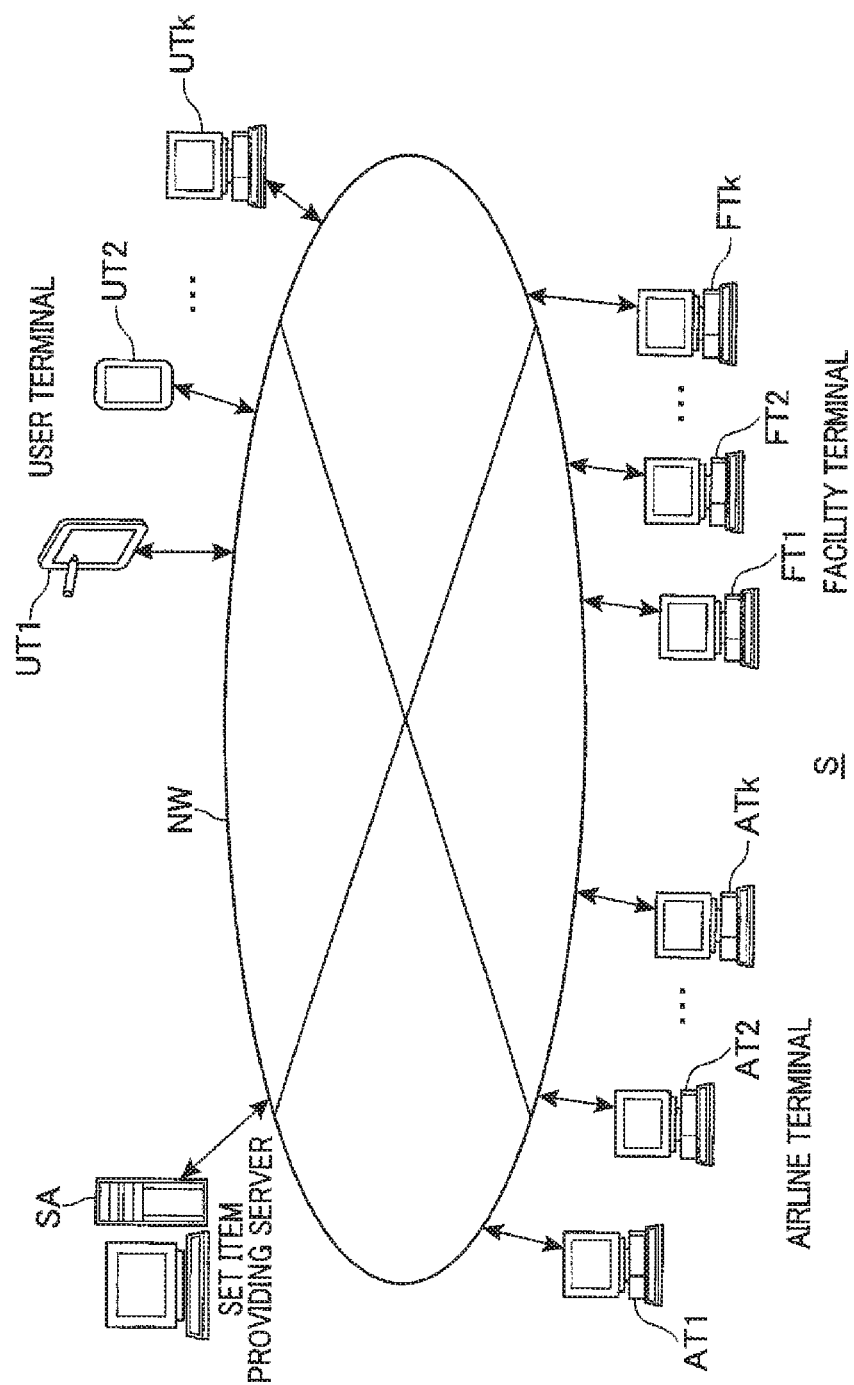
FIG. 1 is a diagram schematically showing an example configuration of a set item providing system S according to this embodiment.

A configuration and a functional overview of a set item providing system S according to this embodiment is first described with reference to FIG. 1. FIG. 1 is a diagram schematically showing an example configuration of the set item providing system S according to this embodiment. As shown in FIG. 1, the set item providing system S includes, for example, airline terminals ATl (l=1, 2 . . . ), facility terminals FTm (l=1, 2 . . . k), user terminals UTn (n=1, 2 . . . k), and a set item providing server SA. The set item providing server SA is an example of an information processing device according to the present invention. The airline terminals ATl, the facility terminals FTm, the user terminals UTn, and the set item providing server SA are each connected to a network NW. The network NW includes, for example, the Internet, a dedicated communication line (e.g., community antenna television (CATV) line), a mobile communication network (including base stations), and a gateway.

Each airline terminal ATl is a terminal device that is used by the corresponding airline. For example, a personal computer can be used as the airline terminal ATl. The airline terminal ATl sends a request for registering airline tickets (tickets for an airplane transportation service), which are provided (sold) by an airline, to the set item providing server SA over the network NW, for example, in response to an operation of an operator of the airline. Thus, the set item providing server SA registers the airline tickets as transportation-related items (first items). Airline tickets in this embodiment are in the form of electronic data. Each airline ticket indicates a ticket number, an airline name, a flight number, a place of departure, a destination, a departure date and time, an arrival date and time, an airfare (the price of the airline ticket), a class of seat, a validity period, and other information. Each ticket number is identification information unique to the corresponding airline ticket.

In some cases, the airline terminal ATl sends a change request, such as a request for reduction in the price of a registered airline ticket to the set item providing server SA over the network NW, for example, in response to an operation of an operator of the airline. Thus, the set item providing server SA reduces, for example, the airfare indicated by the airline ticket subject to the price reduction request. This is aimed to prevent the airline ticket from remaining unsold. Some airlines gradually reduce the airfare indicated by an airline ticket at predetermined intervals. The airline tickets may be designed to be registered in an airline's management server by the airline terminal ATl. In this case, the management server sends the request for registering airline tickets or the change request to the set item providing server SA. Examples of the change request include not only a price reduction request but also a price increase request.

Each facility terminal FTm is a terminal device that is used by the corresponding accommodation facility. For example, a personal computer can be used as the facility terminal FTm. The facility terminal FTm sends a request for registering plan vouchers (vouchers for an accommodation plan (an example of a facility plan)), which are provided (sold) by a facility provider such as the manager of an accommodation facility, to the set item providing server SA over the network NW, for example, in response to an operation of the accommodation facility. Thus, the set item providing server SA registers the plan vouchers as accommodation facility-related items (second items). Plan vouchers in this embodiment are in the form of electronic data. Each plan voucher indicates a plan ID, an accommodation plan name, accommodation plan details, the address of an accommodation facility, the number of rooms to stay in, a check-in date, a checkout date, a charge (the price of the plan voucher), information about the accommodation facility (including its address, its telephone number, and how to access it), and other information. Each plan ID is identification information unique to the corresponding plan voucher.

In some cases, the facility terminal FTm sends a change request, such as a request for reduction in the price of a registered plan voucher to the set item providing server SA over the network NW, for example, in response to an operation of an operator of the accommodation facility. Thus, the set item providing server SA reduces, for example, the charge indicated by the plan voucher subject to the price reduction request. In this embodiment, the set item providing server SA is configured to notify a facility provider of information to prompt reduction in the charge indicated by a plan voucher at a timing to be described later. The plan vouchers may be designed to be registered in an accommodation facility's management server by the facility terminal FTm. In this case, the management server sends the request for registering plan vouchers or the change request to the set item providing server SA. Examples of the change request include not only a price reduction request but also a price increase request.

Each user terminal UTn is a terminal device that is used by the corresponding user. For example, a personal computer, a mobile phone, a personal digital assistant (PDA), a handheld device (smartphone) that is a mobile phone integrated with a personal digital assistant, or a terminal device such as a handheld game console can be used as the user terminal UTn. The user terminal UTn sends a search query including desired purchase conditions for purchasing a set item that is a combination of an airline ticket and a plan voucher to the set item providing server SA over the network NW, for example, in response to an operation of the user. Thus, the set item providing server SA searches for set items that satisfy the desired purchase conditions, and then provides the search results to the user terminal UTn. The desired purchase conditions indicate a budget (budget for a set item) specified by the user, the number of people who will use the set item, a departure date (start date), an end date, a place of departure, a destination, and other information. In some cases, the user may specify a certain range (e.g., \30,000 to \50,000) as the budget. If the desired purchase conditions indicate at least a budget, the present invention can be applied.

Figure 2B:
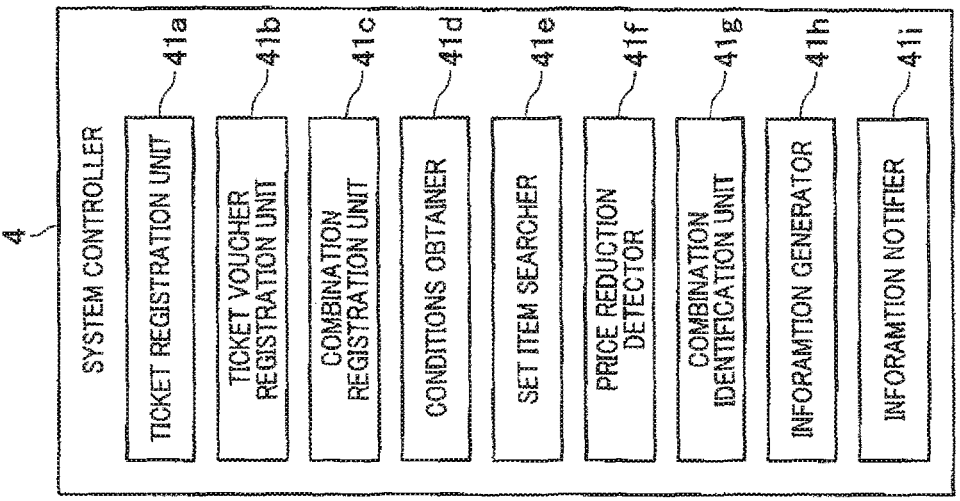
FIG. 2B is a diagram showing example functional blocks of a system controller 4.
Figure 2A:
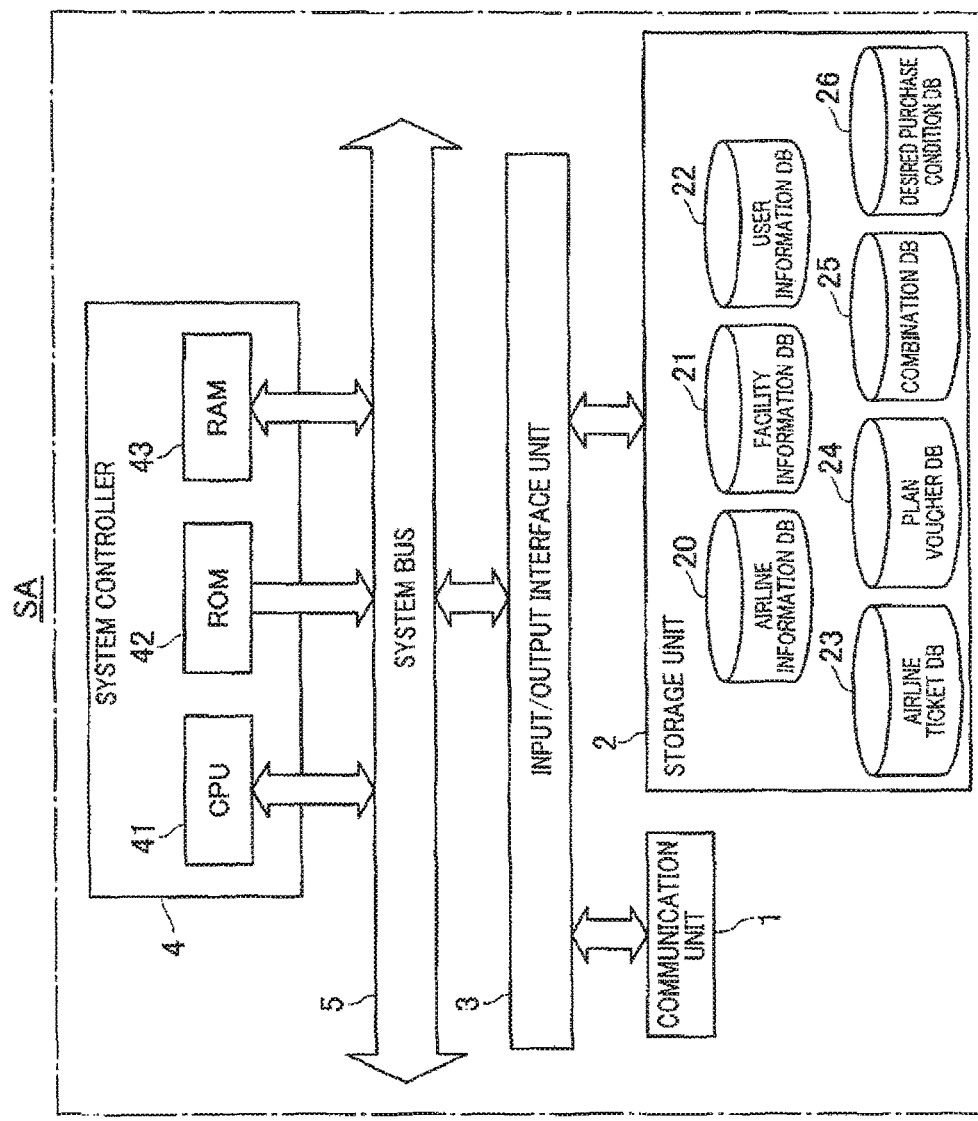
FIG. 2A is a block diagram schematically showing an example configuration of a set item providing server SA according to this embodiment.

The set item providing server SA is a server that provides a website such as a travel offer site. FIG. 2A is a block diagram schematically showing an example configuration of the set item providing server SA according to this embodiment. As shown in FIG. 2A, the set item providing server SA includes, for example, a communication unit 1, a storage unit 2, an input/output interface unit 3, and a system controller 4. The system controller 4 and the input/output interface unit 3 are connected via a system bus 5. The communication unit 1 connects to the network NW and controls the state of communications. The storage unit 2 includes, for example, hard disk drives. The storage unit 2 stores, for example, an operating system (OS) and server programs (including an information processing program according to the present invention). The server programs are downloaded from a predetermined server to the set item providing server SA. Alternatively, the server programs may be stored in a (computer-readable) recording medium, such as a CD or a DVD, and be read from the recording medium into the storage unit 2.

The storage unit 2 also stores structured documents such as hypertext markup language (HTML) documents and XHTML documents, image files, and other data that make up web pages to be displayed on the user terminals UTn. The storage unit 2 further has an airline information database (DB) 20, a facility information database (DB) 21, a user information database (DB) 22, an airline ticket database (DB) 23, a plan voucher database (DB) 24, a combination database (DB) 25, a desired purchase conditions database (DB) 26, and other databases, which have been created therein.

The airline information database 20 stores, for each airline that has been registered as a member, the airline's airline ID, password, airline name, and other information in association with each other. Each airline ID is identification information unique to the corresponding airline. The airline ID and the password are authentication information used in a login process (process for authenticating the airline).

The facility information database 21 stores, for each accommodation facility (facility provider) that has been registered as a member, the accommodation facility's facility ID, password, facility name, address, telephone number, and email address, the number of guest rooms of the accommodation facility, an occupancy rate of the accommodation facility, information about other facilities that differ from the accommodation facility, and other information in association with each other. Each facility ID is identification information unique to the corresponding facility provider (accommodation facility). The facility ID and the password are authentication information used in a login process (process for authenticating the facility).

The occupancy rate is, for example, the percentage (80/100=80%) of the number of occupied guest rooms (e.g., 80) relative to the total number of guest rooms in the accommodation facility (e.g., 100). The number of occupied guest rooms includes both the number of guest rooms being used by guests (including reserved guest rooms) and the total number of guest rooms being provided to the travel offer site. Examples of the type of the occupancy rate include a daily occupancy rate, the average occupancy rate (e.g., the average of seven days of occupancy rates in a week) over a predetermined period of time (e.g., one week), the minimum occupancy rate during a predetermined period of time (e.g., the lowest of seven days of occupancy rates in a week), the maximum occupancy rate during a predetermined period of time (e.g., the highest of seven days of occupancy rates in a week). Such an occupancy rate is, for example, registered by the accommodation facility through its facility terminal FTm or calculated by the set item providing server SA. The set item providing server SA can calculate the above occupancy rate when it manages the number of occupied guest rooms.

The information about other facilities includes, for example, the facility IDs and the occupancy rates of the other facilities. The other facilities mean, for example, facilities that compete with the target accommodation facility or facilities that are similar to the target accommodation facility. The competing facilities and the similar facilities may overlap with each other. The competing facilities correspond, for example, to facilities that provide a plan in the same price range as the target accommodation facility and to facilities that provide a plan having a feature (e.g., an "all-you-can-eat crab" plan and a "beauty treatment" plan) similar to a feature of a plan provided by the target accommodation facility. The competing facilities also correspond to facilities that are compared with the target accommodation facility by a user. For example, facilities that were viewed around the time when the target accommodation facility was viewed (e.g., viewed within a week apart from each other) and facilities that were bookmarked around the time when the target accommodation facility was bookmarked, by the user to make the comparison, may be selected as the competing facilities. The competing facilities may be, for example, specified by each target accommodation facility through its facility terminal FTm or searched for by the set item providing server SA. The similar facilities are facilities that belong to the same category as the target accommodation facility. Examples of the category include "eat", "play", "view", "relax", and "stay". The similar facilities may be facilities that are located in the same area (e.g., area classified as an administrative division) as the target accommodation facility or facilities that are located in an area contiguous to the area of the target accommodation facility. The similar facilities may be facilities that belong to the same category as the target accommodation facility and that are located in the same area as or in an area contiguous to the target accommodation facility. The similar facilities are searched for by the set item providing server SA, for example, based on categories and the address of the target accommodation facility.

The user information database 22 stores, for each user who has signed up as a member, the user's user ID, password, name, address, telephone number, email address, user histories, and other information in association with each other. Each user ID is identification information unique to the corresponding user. The user ID and the password are authentication information used in a login process (process for authenticating the user). Examples of the user histories include the user's search history, the user's viewing history, the user's bookmarking history, and the user's purchase history. The search history includes the facility names (or facility IDs) of facilities and the plan names (or plan IDs) of facility plans that were retrieved by the user on a web page provided, for example, by the set item providing server SA or a website that provides information about facilities, the corresponding search dates and times, and other information. The viewing history includes the facility names (or facility IDs) of facilities and the plan names (or plan IDs) of facility plans that were viewed by the user on a web page provided, for example, by the set item providing server SA or a website that provides information about facilities, the corresponding viewed dates and times, and other information. The bookmarking history includes the facility names (or facility IDs) of facilities and the plan names (or plan IDs) of facility plans that were bookmarked by the user (added to his or her favorites) on a web page provided, for example, by the set item providing server SA or a website that provides information about facilities, the corresponding registration dates and times, and other information. The purchase history includes the plan names (or plan IDs) of facility plans that were purchased by the user on a web page provided, for example, by the set item providing server SA or a website that provides information about facilities, the corresponding purchase dates and times, and other information.

The airline ticket database 23 stores airline tickets provided from the airline terminals AT1 and the airline IDs of the airlines that provided the airline tickets in association with each other. The plan voucher database 24 stores plan vouchers provided from the facility terminals FTm and the facility IDs of the facility providers that provided the plan vouchers in association with each other. The combination database 25 stores, for each combination (combination that is available for sale as a set item) of an airline ticket stored in the airline ticket database 23 and a plan voucher stored in the plan voucher database 24, the combination, the number of times that any set of desired purchase conditions, which is included in a search query received from a user terminal UTn, was satisfied (hereinafter, referred to as "the number of hits"), and other information in association with each other. FIG. 3A is a diagram showing an example of information stored in the combination database 25. In the example of FIG. 3A, as a combination of an airline ticket and a plan voucher, the ticket number of the airline ticket and the plan ID of the plan voucher are stored in association with each other. Each row of the table shown in the example of FIG. 3A corresponds to one set item. Each set item is assigned a serial number. A combination that has no hits corresponds to a combination that does not meet any set of desired purchase conditions.

The desired purchase conditions database 26 stores, for each set of desired purchase conditions, the reception date and time of a search query received from a user terminal UTn, the user ID of a user of the user terminal UTn, desired purchase conditions included in the search query, the number of hits, the number of sales, and other information in association with each other. The number of sales is the number of times that a set item satisfying the desired purchase conditions was sold (by a user). FIG. 3B is a diagram showing an example of information stored in the desired purchase conditions database 26. Each row of the table shown in the example of FIG. 3B corresponds to one record. Each record is assigned a serial number. If there is a set item that satisfies desired purchase conditions, the record including the desired purchase conditions may be deleted from the desired purchase conditions database 26.

The system controller 4 as a computer includes, for example, a CPU 41 (processor), a ROM 42, and a RAM 43. The system controller 4 executes, for example, the server programs on the OS. FIG. 2B is a diagram showing example functional blocks of the system controller 4. As shown in FIG. 2B, the system controller 4 executes the server programs to function as, for example, an airline ticket registration unit 41a, a ticket voucher registration unit 41b, a combination registration unit 41c, a conditions obtainer 41d, a set item searcher 41e, a price reduction detector 41f, a combination identification unit 41g, an information generator 41h, and an information notifier 41i. The airline ticket registration unit 41a is an example of first registering means of the present invention. The ticket voucher registration unit 41b is an example of second registering means of the present invention. The conditions obtainer 41d is an example of obtaining means of the present invention. The information generator 41h is an example of first identifying means, second identifying means, and third identifying means of the present invention. The information notifier 41i is an example of notification means of the present invention.

The airline ticket registration unit 41a stores airline tickets in the airline ticket database 23, in response to a registration request from an airline terminal AT1. The airline ticket registration unit 41a also performs a process for reducing the airfare indicated by a registered airline ticket, in response to a price reduction request from the airline terminal AT1. For example, the price reduction request includes the ticket number of an airline ticket and a reduction in price (i.e., a markdown). The airline ticket registration unit 41a identifies, from the airline ticket database 23, which airline ticket indicates the ticket number included in the price reduction request, and updates the corresponding entry stored in the airline ticket database 23 with the airfare obtained by subtracting the reduction in price from the airfare indicated by the identified airline ticket as a reduced airfare. The price reduction request may include the reduced airfare instead of the reduction in price. In this case, in place of the airfare indicated by the above identified airline ticket, the airline ticket registration unit 41a updates the corresponding entry stored in the airline ticket database 23 with the reduced airfare included in the price reduction request.

The ticket voucher registration unit 41b stores plan vouchers in the plan voucher database 24, in response to a registration request from a facility terminal FTm. The ticket voucher registration unit 41b also performs a process for reducing the charge indicated by a registered plan voucher, in response to a price reduction request from the facility terminal FTm. For example, the price reduction request includes the plan ID of a plan voucher and a reduction in price (or a reduced charge). The ticket voucher registration unit 41b identifies, from the plan voucher database 24, which plan voucher indicates the plan ID included in the price reduction request, and updates the corresponding entry stored in the plan voucher database 24 with the charge obtained by subtracting the reduction in price from the charge indicated by the identified plan voucher as a reduced charge. Alternatively, in place of the charge indicated by the above identified plan voucher, the ticket voucher registration unit 41b updates the corresponding entry stored in the plan voucher database 24 with a reduced charge included in the price reduction request.

The combination registration unit 41c generates a combination that is available for sale as a set item (an airline ticket and plan voucher combination), based on the airline tickets stored in the airline ticket database 23 and the plan vouchers stored in the plan voucher database 24. For example, the combination registration unit 41c determines whether the start and end dates indicated by an identified airline ticket and the check-in and checkout dates indicated by an identified plan voucher are the same, whether the difference in distance between the destination indicated by the airline ticket and the address of the accommodation facility indicated by the plan voucher is less than or equal to a predetermined distance, and other conditions. For example, if the condition that the above pairs of dates are the same, the condition that the above difference in distance is less than or equal to the predetermined distance, and other conditions are met, the combination registration unit 41c generates a combination of the airline ticket and the plan voucher as a combination that is available for sale as a set item, and stores the generated combination (e.g., a combination of the ticket number of the airline ticket and the plan ID of the plan voucher) and the number of hits (the initial value is 0) in association with each other in the combination database 25. The combination generation shown here is merely an example, and a combination can be generated in accordance with other various conditions. An airline ticket and plan voucher combination is generated and registered, for example, when a registration request from an airline terminal ATl or a registration request from a facility terminal FTm is made, or at predetermined intervals after registration of airline tickets or plan vouchers.

The conditions obtainer 41d obtains desired purchase conditions from a search query from a user terminal UTn. The conditions obtainer 41d stores the desired purchase conditions obtained from the search query, the reception date and time of the search query, the user ID of a user of the user terminal UTn that has sent the search query, the number of hits (the initial value is 0), and the number of sales (the initial value is 0) in association with each other in the desired purchase conditions database 26. When the price reduction detector 41f detects a reduction in the airfare indicated by an airline ticket, the conditions obtainer 41d further retrieves sets of desired purchase conditions under which no combination has been found (i.e., sets of desired purchase conditions that have no hits) from the desired purchase conditions database 26, among the sets of desired purchase conditions stored in the desired purchase conditions database 26.

The set item searcher 41e searches for the combinations that satisfy the desired purchase conditions obtained from the search query, among the combinations (airline ticket and plan voucher combinations) stored in the combination database 25. For example, the set item searcher 41e determines whether the start (departure) and end dates indicated by the desired purchase conditions and the check-in and checkout dates indicated by the plan voucher included in a combination are the same, whether the difference in distance between the destination indicated by the desired purchase conditions and the address of the accommodation facility indicated by the plan voucher included in the combination is less than or equal to a predetermined distance, and other conditions. The set item searcher 41e then identifies which combinations satisfy, for example, the condition that the above pairs of dates are the same, the condition that the above difference in distance is less than or equal to the predetermined distance, and the other conditions. From among the identified combinations, the set item searcher 41e further searches for combinations in which the sum of the airfare indicated by the airline ticket and the charge indicated by the plan voucher (the total price of the airline ticket and the plan voucher) is less than or equal to the budget indicated by the desired purchase conditions, as combinations that satisfy the desired purchase conditions. For example, when the user's budget is \80,000, combinations with a total price less than or equal to \80,000 are found as the combination that satisfy the desired purchase conditions. On the other hand, in this case, if no combination with a total price less than or equal to \80,000 is stored, no combination that satisfies the desired purchase conditions is found.

The set item searcher 41e sends the search results to the user terminal UTn that has sent the search query. Thus, the user terminal UTn displays the search results on its display screen. For example, if the above combinations that satisfy the above desired purchase conditions are found, the set items corresponding to the combinations are displayed as the search results on the display screen of the user terminal UTn. In this case, the set item searcher 41e adds 1 to each of the numbers of hits that are stored in association with the combinations in the combination database 25 and adds 1 to the number of hits that is stored in association with the desired purchase conditions in the desired purchase conditions database 26. On the other hand, if the above combinations that satisfy the above desired purchase conditions are not found, the information that no combination satisfies the desired purchase conditions is displayed as the search result on the display screen of the user terminal UTn.

The price reduction detector 41f detects a reduction in the airfare indicated by an airline ticket, for example, when a price reduction request is received from an airline terminal ATl. The combination identification unit 41g identifies, from the combination database 25, combinations that include the airline ticket whose airfare has been reduced (i.e., the airline ticket that indicates the ticket number included in the price reduction request), from among combinations that do not meet any set of desired purchase conditions (i.e., combinations that have no hits). The combination identification unit 41g identifies which of the identified combinations fail to satisfy set(s) of desired purchase conditions obtained by the conditions obtainer 41d (i.e., set(s) of desired purchase conditions under which no combination has been found). For example, the combination identification unit 41g determines whether the start (departure) and end dates indicated by each set of desired purchase conditions and the check-in and checkout dates indicated by the plan voucher included in a combination are the same, whether the difference in distance between the destination indicated by the desired purchase conditions and the address of the accommodation facility indicated by the plan voucher included in the combination is less than or equal to a predetermined distance, and other conditions, to identify which combinations satisfy, for example, the condition that the above pairs of dates are the same and the condition, the condition that the above difference in distance is less than or equal to the predetermined distance, and the other conditions. From among the identified combinations, the combination identification unit 41g identifies combinations in which the sum of the airfare indicated by the marked-down airline ticket and the charge indicated by a plan voucher (i.e., the total price of the airline ticket (marked-down airline ticket) and a plan voucher) is higher than the budget indicated by the desired purchase conditions, as combinations that fail to satisfy the desired purchase conditions. That is, in this case, the combination identification unit 41g identifies combinations that satisfy the desired purchase conditions except the condition for the budget (combinations whose total price fails to satisfy the budget) as combinations that fail to satisfy the desired purchase conditions. When the desired purchase conditions indicate only the budget, the combination identification unit 41g identifies combinations whose total price fails to satisfy the budget as combinations that fail to satisfy the desired purchase conditions.

The information generator 41h generates information to prompt reduction in the charge indicated by the plan voucher included in each combination identified by the combination identification unit 41g. The information to prompt price reduction prompts the facility provider that provides the plan voucher included in the combination to reduce the price of the plan voucher included in the combination because the combination, in which the airline ticket has been marked down, does not yet meet the desired purchase conditions. For example, as will be described later, the information to prompt price reduction is effective if it is information indicating the relationship between a budget and the number of consumers.

The information notifier 41i notifies the information to prompt price reduction generated by the information generator 41h to the facility provider that provides the plan voucher included in the combination identified by the combination identification unit 41g.

2. How Set Item Providing System S Works

Figure 4:
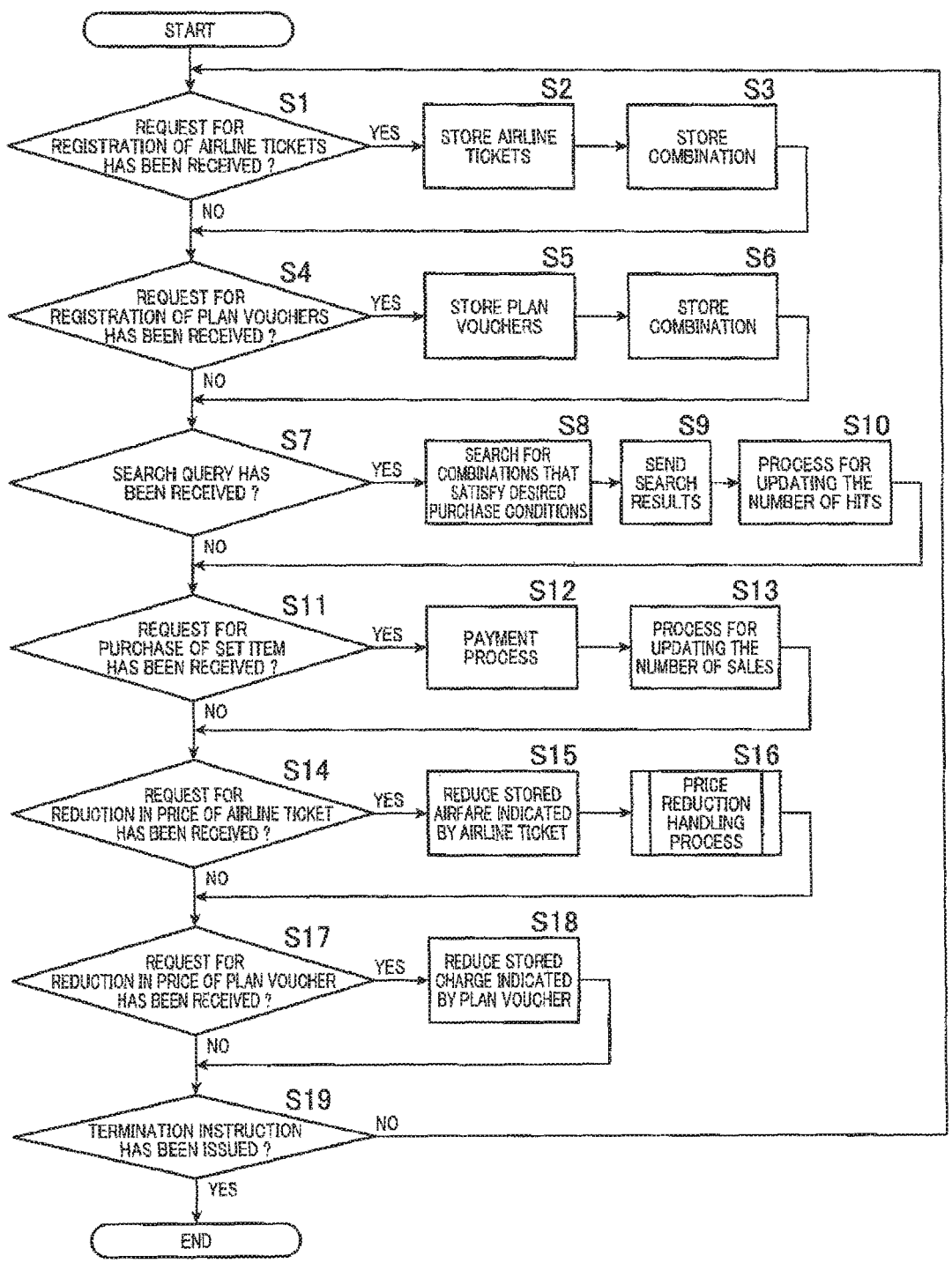
FIG. 4 is a flowchart showing an example of a main process in the system controller 4.

The following describes how the set item providing system S according to this embodiment works with reference to FIG. 4 and other figures. FIG. 4 is a flowchart showing an example of a main process in the system controller 4. The process shown in FIG. 4 is started, for example, at power-on.

In Step S1 shown in FIG. 4, the system controller 4 determines whether a request for registration of airline tickets has been received from an airline terminal ATl. If the system controller 4 determines that the request for registration of airline tickets has been received (YES in Step S1), the main process proceeds to Step S2. On the other hand, if the system controller 4 determines that the request for registration of airline tickets has not been received (NO in Step S1), the main process proceeds to Step S4.

In Step S2, the system controller 4 (the airline ticket registration unit 41a) stores the airline tickets provided from the airline terminal ATl together with the registration request from the airline terminal ATl and the airline ID of the airline that has provided the airline tickets in association with each other in the airline ticket database 23. Subsequently, the system controller 4 (the combination registration unit 41c) generates a combination that is available for sale as a set item as described above, based on the airline tickets stored in Step S2 and the plan vouchers stored in the plan voucher database 24, and stores the generated combination and the number of hits in association with each other in the combination database 25 (Step S3). The main process then proceeds to Step S4.

In Step S4, the system controller 4 determines whether a request for registration of plan vouchers has been received from a facility terminal FTm. If the system controller 4 determines that the request for registration of plan vouchers has been received (YES in Step S4), the main process proceeds to Step S5. On the other hand, if the system controller 4 determines that the request for registration of plan vouchers has not been received (NO in Step S4), the main process proceeds to Step S7.

In Step S5, the system controller 4 (the ticket voucher registration unit 41b) stores the plan vouchers provided from the facility terminal FTm together with the registration request from the facility terminal FTm and the facility ID of the facility provider that has provided the plan vouchers in association with each other in the plan voucher database 24. Subsequently, the system controller 4 (the combination registration unit 41c) generates a combination that is available for sale as a set item as described above, based on the plan vouchers stored in Step S5 and the airline tickets stored in the airline ticket database 23, and stores the generated combination and the number of hits in association with each other in the combination database 25 (Step S6). The main process then proceeds to Step S7.

In Step S7, the system controller 4 determines whether a search query including desired purchase conditions specified by a user has been received from a user terminal UTn. If the system controller 4 determines that the search query has been received (YES in Step S7), the main process proceeds to Step S8. On the other hand, if the system controller 4 determines that the search query has not been received (NO in Step S7), the process main proceeds to Step S11.

In Step S8, using the desired purchase conditions obtained from the search query received in Step S7, the system controller 4 (the set item searcher 41e) searches for combinations that satisfy the desired purchase conditions from among the combinations stored in the combination database 25. Subsequently, the system controller 4 (the set item searcher 41e) sends the search results obtained in Step S8 to the user terminal UTn that has sent the search query (Step S9). For example, if the above combinations that satisfy the above desired purchase conditions are found, the set items corresponding to the combinations are displayed as the search results so that they can be selected on the display screen of the user terminal UTn.

Subsequently, if any combinations that satisfy the desired purchase conditions are found in Step S8, the system controller 4 (the set item searcher 41e) performs a process for updating the number of hits (Step S10). The main process then proceeds to Step S11. The update process adds 1 to each of the numbers of hits that are stored in association with the combinations found by the search in the combination database 25, and adds 1 to the number of hits that is stored in association with the desired purchase conditions used for the search in the desired purchase conditions database 26.

In Step S11, the system controller 4 determines whether a request for purchase of a set item selected by the user has been received from the user terminal UTn. If the system controller 4 determines that the request for purchase has been received (YES in Step S11), the main process proceeds to Step S12. On the other hand, if the system controller 4 determines that the request for purchase has not been received (NO in Step S11), the main process proceeds to Step S14.

In Step S12, the system controller 4 performs a predetermined payment process for the set item subject to the purchase request. Thus, the sale of the set item is completed. Subsequently, the system controller 4 performs a process for updating the number of sales (Step S13). The main process then proceeds to Step S14. The update process deletes the record including the sold combination from the combination database 25, and adds 1 to the number of sales that is stored in association with the desired purchase conditions used for the search of the combination in the desired purchase conditions database 26.

In Step S14, the system controller 4 determines whether a request for reduction in the price of a registered airline ticket has been received from an airline terminal ATl. If the request for reduction in the price of a registered airline ticket has been received (YES in Step S14), the system controller 4 (the price reduction detector 41f) detects a reduction in the airfare indicated by the airline ticket. The main process then proceeds to Step S15. On the other hand, if the system controller 4 determines that the request for reduction in the price of a registered airline ticket has not been received (NO in Step S14), the main process proceeds to Step S17.

In Step S15, the system controller 4 (the airline ticket registration unit 41a) identifies, from the airline ticket database 23, which airline ticket indicates the ticket number included in the price reduction request received in Step S14, and reduces the stored airfare indicated by the identified airline ticket. For example, the system controller 4 (the airline ticket registration unit 41a) updates the corresponding entry stored in the airline ticket database 23 with the airfare obtained by subtracting a reduction in price from the airfare indicated by the airline ticket identified from the airline ticket database 23 as a reduced airfare. Alternatively, in place of the airfare indicated by the airline ticket identified from the airline ticket database 23, the system controller 4 (the airline ticket registration unit 41a) updates the corresponding entry stored in the airline ticket database 23 with a reduced airfare included in the above price reduction request.

Figure 5:
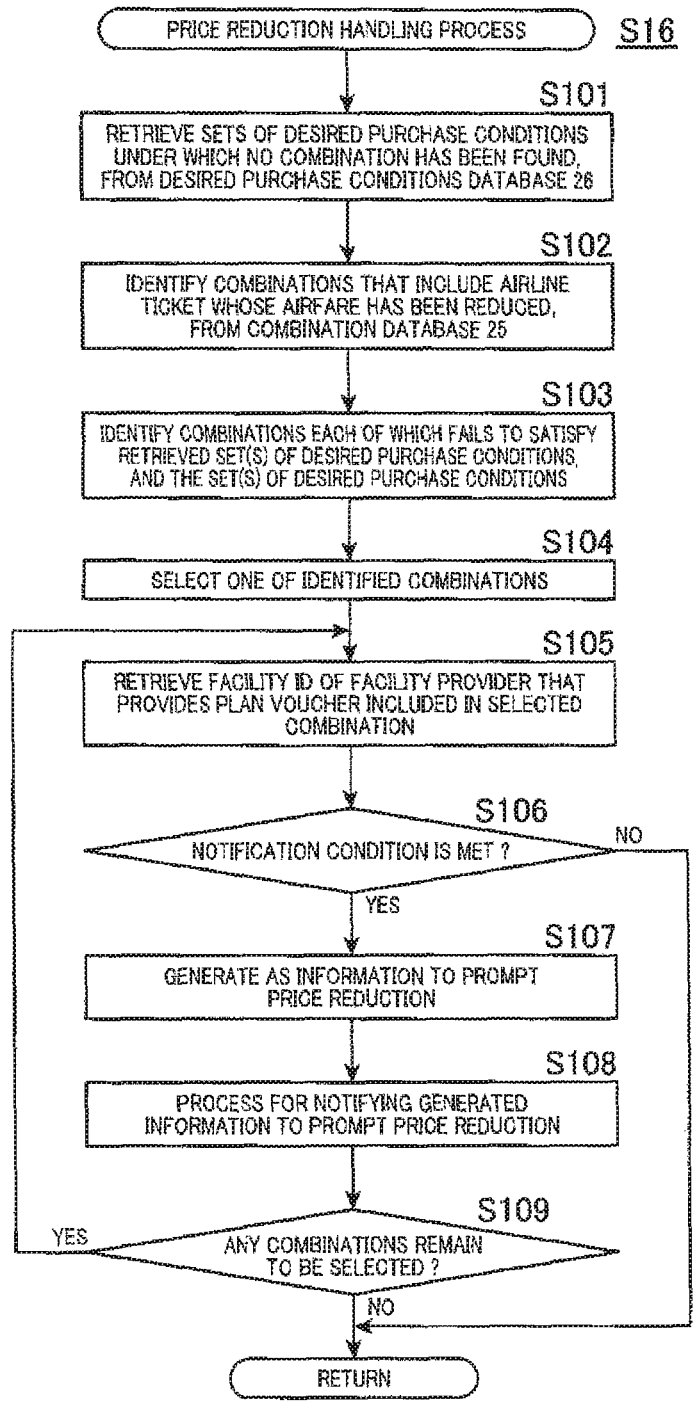
FIG. 5 is a flowchart showing details of a price reduction handling process in Step S16 shown in FIG. 4.

Subsequently, the system controller 4 performs a price reduction handling process (Step S16). FIG. 5 is a flowchart showing details of the price reduction handling process in Step S16 shown in FIG. 4. In Step S101 shown in FIG. 5, the system controller 4 (the conditions obtainer 41d) retrieves sets of desired purchase conditions under which no combination has been found (i.e., sets of desired purchase conditions that have no hits) from the desired purchase conditions database 26, among the sets of desired purchase conditions stored in the desired purchase conditions database 26. In addition to these desired purchase conditions, the system controller 4 may be configured to also retrieve sets of desired purchase conditions under which some combinations were found but no combination has been sold (i.e., sets of desired purchase conditions that have no sales) from the desired purchase conditions database 26.

Subsequently, the system controller 4 (the combination identification unit 41g) identifies, from the combination database 25, combinations that include the airline ticket whose airfare has been reduced (the airline ticket that indicates the ticket number included in the price reduction request received in Step S14), from among combinations that have never met any set of desired purchase conditions before (i.e., combinations that have no hits) (Step S102).

Subsequently, the system controller 4 (the combination identification unit 41g) identifies combinations each of which satisfies set(s) of desired purchase conditions retrieved in Step S101 except the condition for the budget (e.g., whose total price of the marked-down airline ticket and a plan voucher does not meet only the budget), among the combinations identified in Step S102, as combinations each of which fails to satisfy set(s) of desired purchase conditions, and identifies the set(s) of desired purchase conditions (Step S103). If a plurality of combinations are identified in Step S103, one or more sets of desired purchase conditions (hereinafter, referred to as "set(s) of desired purchase conditions corresponding to a combination") are identified for each of the combinations. If no combination is identified in Step S102 or S103, the process transitions to Step S17.

Subsequently, the system controller 4 selects one of the combinations identified in Step S103 (Step S104). If a plurality of combinations are identified in Step S103, the combinations are selected in order of increasing serial numbers. The system controller 4 then retrieves the facility ID of the facility provider that provides the plan voucher (the facility ID associated with the plan ID of the plan voucher) included in the combination selected in Step S104 from the plan voucher database 24 (Step S105). An accommodation facility of the facility provider identified by the facility ID thus retrieved is referred to as a target accommodation facility.

Subsequently, the system controller 4 determines whether a notification condition for notifying information to prompt price reduction is met (Step S106). If the system controller 4 determines that the notification condition is met (YES in Step S106), the main process proceeds to Step S107. On the other hand, if the system controller 4 determines that the notification condition is not met (NO in Step S106), the process transitions to Step S109. For example, the process may be designed by a system administrator so as to skip the determination in S106 and transition to Step S107. Alternatively, the determination in Step S106 may be performed after Step S107 (after generation of the information to prompt price reduction).

The following describes notification conditions 1 to 4 for notifying information to prompt price reduction.

(a) Notification Condition 1

In this case, the system controller 4 identifies, from the desired purchase conditions database 26, how many users specified the budget indicated by one of the set(s) of desired purchase conditions corresponding to the combination identified in Step S103 (i.e., set(s) of desired purchase conditions that cause the combination of the marked-down airline ticket and a plan voucher to fail to satisfy the budget indicated by one of the above set(s) of desired purchase conditions (to satisfy the set(s) of desired purchase conditions except the condition(s) for the budget)). If the number of the users is less than or equal to a threshold value, it is determined that the condition for notifying information to prompt price reduction is satisfied. This allows for notification of the information to prompt price reduction to the facility provider of the corresponding target accommodation facility only when the number of consumers of the combination identified in Step S103 is less than or equal to the threshold value. This is because when the number of potential users of an accommodation plan provided by the target accommodation facility is large, the corresponding plan voucher of the accommodation facility will be shortly sold without being marked down. In such a case, notification to the facility provider can be limited. Consequently, the load on the server and the load on the network can be reduced. The number of the users is identified by counting the user IDs stored in association with the set(s) of desired purchase conditions corresponding to the combination identified in Step S103 in the desired purchase conditions database 26. However, as shown in FIG. 3B, if the same user ID is stored across a plurality of records, the same user ID already counted is not counted any more.

Alternatively, the system controller 4 may identify how many active users are included in the users who specified the budget indicated by one of the set(s) of desired purchase conditions corresponding to the combination identified in Step S103, and may determine that the condition for notifying information to prompt price reduction is satisfied if the number of active users is less than or equal to a threshold value. The active users are users who searched for set items within a predetermined period of time (e.g., a week) starting backward from the current time. For example, by referring to the reception dates and times (reception dates and times of search queries) stored in the desired purchase conditions database 26, the system controller 4 identifies, as the number of active users, the number of users who specified the budget indicated by one of the set(s) of desired purchase conditions corresponding to the combination identified in Step S103 within the predetermined period of time (e.g., a week) starting backward from the current time, from among the users who specified the budget indicated by one of the set(s) of desired purchase conditions. Alternatively, the system controller 4 may identify, as the number of active users, the number of users who specified the budget indicated by one of the set(s) of desired purchase conditions more than once within a predetermined period of time (e.g., a week) starting backward from the current time. Alternatively, the system controller 4 may identify, as the number of active users, the number of users who specified the budget indicated by one of the set(s) of desired purchase conditions a predetermined number of times (e.g. three times) or more (e.g., users who frequently made an action to specify the budget) within a predetermined period of time (e.g., a week) starting backward from the current time. Moreover, the system controller 4 may identify, as the number of active users, the number of users who specified the budget indicated by one of the set(s) of desired purchase conditions in a pattern that matches a predetermined pattern.

Alternatively, the system controller 4 may identify how many users give first choice to the accommodation facility (target accommodation facility) of the facility provider identified by the facility ID retrieved in Step S105, in the users who specified the budget indicated by one of the set(s) of desired purchase conditions corresponding to the combination identified in Step S103, and may determine that the condition for notifying information to prompt price reduction is satisfied if the number of users who give the first choice is less than or equal to a threshold value. The users who give first choice to the accommodation facility mean, for example, users who viewed at least an accommodation plan provided by the facility provider identified by the facility ID retrieved in Step S105. Such users can be estimated to be users who are interested in the accommodation facility. For example, the system controller 4 identifies, from the user information database 22, the user histories (e.g., the search histories, the viewing histories, and the bookmarking histories) associated with the user IDs of the users who specified the budget indicated by one of the set(s) of desired purchase conditions corresponding to the combination identified in Step S103. The system controller 4 then counts the number of user IDs associated with the user histories that include the facility name (or the facility ID) of the accommodation facility of the facility provider identified by the facility ID retrieved in Step S105 or the plan name (or the plan ID) of an accommodation plan provided by the facility provider, among the identified user histories, to identify how many users give first choice to the target accommodation facility. Alternatively, for example, based on the user histories, the system controller 4 may identify the number of users who compare the accommodation facility of the facility provider identified by the facility ID retrieved in Step S105 with a competing facility thereof as the number of users who give the above first choice.

(b) Notification Condition 2

In this case, the system controller 4 retrieves, from the facility information database 21, an occupancy rate (e.g., a daily occupancy rate, an average occupancy rate, a minimum occupancy rate, or a maximum occupancy rate) of the accommodation facility associated with the facility ID retrieved in Step S105, and determines that the condition for notifying information to prompt price reduction is satisfied if the occupancy rate is less than or equal to a threshold value (e.g., 80%). This allows for notification of the information to prompt price reduction to the facility provider of the target accommodation facility only when the occupancy rate of the accommodation facility is less than or equal to the threshold value. This is because when the occupancy rate of the accommodation facility is high, such as 90%, plan vouchers of the accommodation facility will not need to be marked down. In such a case, notification to the facility provider can be limited. Consequently, the load on the server and the load on the network can be reduced.

(c) Notification Condition 3

In this case, the system controller 4 retrieves, from the facility information database 21, the occupancy rate of the accommodation facility associated with the facility ID retrieved in Step S105 and the occupancy rates of other facilities (e.g., its competing facilities or similar facilities), and determines that the condition for notifying information to prompt price reduction is satisfied if the occupancy rate of the facility is less than the occupancy rates of the other facilities. This allows for notification of the information to prompt price reduction to the facility provider of the target accommodation facility only when the occupancy rate of the accommodation facility is lower than the occupancy rates of the other facilities. This is because when the occupancy rate of the accommodation facility is, for example, higher than the occupancy rates of the competing facilities, plan vouchers of the accommodation facility will not need to be marked down. In such a case, notification to the facility provider can be limited. Consequently, the load on the server and the load on the network can be reduced.

(d) Notification Condition 4

In this case, the system controller 4 may identify, from the airline ticket database 23, the number of stocks of the airline ticket included in the combination selected in Step S104, and may determine that the condition for notifying information to prompt price reduction is satisfied if the number of the stocks is less than or equal to a threshold value. This allows for notification of the information to prompt price reduction to the facility provider of the corresponding accommodation facility only when the number of stocks of the airline ticket included in the combination selected in Step S104 is less than or equal to the threshold value. This is because when the number of the stocks is large, plan vouchers of the target accommodation facility will not need to be marked down. This is because, for example, when an airline ticket that is sold in combination with an accommodation plan is fully stocked, it is unlikely that the combination of the airline ticket and the accommodation plan will be unavailable because of lack of the airline ticket although the accommodation plan is remaining fully stocked. Thus, in such a case, notification to the facility provider can be limited. Consequently, the load on the server and the load on the network can be reduced.

The process may be designed to proceed to Step S107 if any two or more of the above notification conditions are all met (e.g., both the notification conditions 2 and 3 are met).

In Step S103, the system controller 4 (the information generator 41*h*) identifies, for each of a plurality of budget levels, the number of users who specified the budget indicated by one of the set(s) of desired purchase conditions corresponding to the combination identified in Step S103, and generates, as the information to prompt price reduction, information associating, for each budget level, the identified number of users with the budget level. The number of the users is identified in the same way as that in the above Step S106.

FIG. 6A is a diagram showing an example of association information associating, for each budget level, the number of users with the budget level. In FIG. 6A, there are nine levels of budgets. For example, a budget of \80,000 is associated with the top level (No. 1 level), with which the number of users, 20, who specified \80,000 as his or her budget is associated. Such association information allows the facility provider of the target accommodation facility to know the number of users (the number of potential users) who are searching for set items at each budget level, and thus to determine how much to reduce the price. That is, this process allows the facility provider to be provided with information useful for determining how much to reduce the price. A budget range, such as \75,000 to \80,000, may be associated with a budget level. In this case, the number of users who specified a budget between \75,000 and \80,000 is associated with the level.

Alternatively, the system controller 4 (the information generator 41h) may be configured to identify, for each of a plurality of budget levels, the number of users who specified the budget indicated by one of the set(s) of desired purchase conditions corresponding to the combination identified in Step S103, and to generate, as the information to prompt price reduction, information associating, for each budget level, the identified number of users, an airline ticket budget, and the number of airline tickets in stock with the budget level. The airline ticket budget is the amount obtained by subtracting the charge indicated by a plan voucher associated with the facility ID retrieved in Step S105 from the budget (budget for a set item corresponding to a combination) associated with each level. The number of airline tickets in stock is the number of airline tickets in stock that are available for sale (purchase) at the airline ticket budget. The number of airline tickets in stock is identified, for example, from the airline ticket database 23. In other words, the number of airline tickets in stock is the maximum number of set items available for sale. The information to prompt price reduction in this case may not include the airline ticket budget.

FIG. 6B is a diagram showing an example of association information associating, for each budget level, the number of users, an airline ticket budget, and the number of airline tickets in stock with the budget level. The airline ticket budgets shown in FIG. 6B are, for example, budgets obtained when the corresponding plan voucher is \50,000. Such association information allows the facility provider of the target accommodation facility to know how many airline tickets are in stock with respect to the number of users who are searching for set items at each budget level, and thus to better determine how much to reduce the price. The system controller 4 (the information generator 41h) may put, in the information to prompt price reduction in this case, the number of users who can purchase a set item at each budget level as an estimated number of potential users. For example, the number of users (an estimated number of potential users) who can purchase a set item at \75,000 associated with the No. 2 level shown in FIG. 6B is 60, which is the sum of the number of users associated with the No. 2 level, 40, and the number of users associated with the No. 1 level higher than the No. 2 level, 20.

FIG. 6C is a diagram showing an example of association information associating, for each budget level, the number of users, an airline ticket budget, the number of airline tickets in stock, and the above estimated number of potential users with the budget level. Such association information allows the facility provider of the target accommodation facility to know at a glance the number of users (an estimated number of potential users) who can purchase a set item at each budget level and the budget borderline beyond which the number of airline tickets in stock becomes less than the estimated number of potential users, and thus to better determine how much to reduce the price.

Alternatively, the system controller 4 (the information generator 41h) may identify how many active users are included among the users who specified the budget indicated by one of the set(s) of desired purchase conditions corresponding to the combination identified in Step S103, and may generate, as the information to prompt price reduction, information associating, for each budget level, the identified number of active users with the budget level (or information further associating the number of airline tickets in stock and the like, as described above). The number of active users is identified in the same way as that in the above Step S106.

FIG. 6D is a diagram showing an example of association information associating, for each budget level, the number of users, the number of active users among the users, an airline ticket budget, the number of airline tickets in stock, and an estimated number of potential users with the budget level. Such association information allows the facility provider of the target accommodation facility to know the number of users who are likely to actually purchase a set item at each budget level, and thus to better determine how much to reduce the price.

Alternatively, the system controller 4 (the information generator 41h) may identify how many users give first choice to the accommodation facility (target accommodation facility) of the facility provider identified by the facility ID retrieved in Step S105, among the users who specified the budget indicated by one of the set(s) of desired purchase conditions corresponding to the combination identified in Step S103, and may generate, as the information to prompt price reduction, information associating, for each budget level, the identified number of users who give the first choice with the budget level (or information further associating the number of airline tickets in stock and the like, as described above). The number of users who give first choice to the target accommodation facility is identified in the same way as that in the above Step S106.

FIG. 6E is a diagram showing an example of association information associating, for each budget level, the number of users, the number of users who give first choice to a target accommodation facility among the users, an airline ticket budget, the number of airline tickets in stock, the number of accommodation plans in stock that are provided by the target accommodation facility, and an estimated number of potential users with the budget level. Such association information allows the facility provider of the target accommodation facility to know the number of users who are highly likely to actually purchase a set item (the number of users who should be preferentially attracted) at each budget level, and thus to better determine how much to reduce the price.

Subsequently, the system controller 4 (the information notifier 41i) performs a notification process for notifying the information to prompt price reduction generated in Step S107 (process for notifying information to prompt price reduction) to the facility provider of the above target accommodation facility (Step S108). For example, the system controller 4 (the information notifier 41i) specifies, from the plan voucher database 24, the facility ID retrieved in Step S105. The system controller 4 (the information notifier 41i) then stores, in the facility information database 21, the information to prompt price reduction generated in Step S107 in association with the facility ID specified from the plan voucher database 24. When the facility provider identified by the facility ID logs in via a facility terminal FTm, the system controller 4 sends, to the facility terminal FTm, a web page in which the stored information to prompt price reduction is written. The web page thus sent is displayed by the facility terminal FTm. Consequently, the information to prompt price reduction is notified to the facility provider of the target accommodation facility. Alternatively, the system controller 4 (the information notifier 41i) retrieves, from the facility information database 21, the email address stored in association with the facility ID retrieved from the plan voucher database 24, and sends, to the email address (to an email server), an email in which the information to prompt price reduction generated in Step S107 is written. The email thus sent is received from the mail server and displayed, for example, by the facility terminal FTm. Consequently, the information to prompt price reduction is notified to the facility provider of the target accommodation facility. In this manner, in step with a reduction in the price of an airline ticket, a facility provider can be timely prompted to reduce the price of a plan voucher combined with the airline ticket.

Subsequently, the system controller 4 determines whether any of the combinations identified in Step S103 remain to be selected (Step S109). If the system controller 4 determines that some of the combinations identified in Step S103 remain to be selected (YES in Step S109), the process returns to Step S104. The system controller 4 selects one of the combinations that remain to be selected and then performs the same steps as above. On the other hand, if the system controller 4 determines that none of the combinations identified in Step S103 remains to be selected (NO in Step S109), the process transitions to Step S17.

In Step S17, the system controller 4 determines whether a request for reduction in the price of a registered plan voucher has been received from a facility terminal FTm. If the system controller 4 determines that the request for reduction in the price of a registered plan voucher has been received (YES in Step S17), the main process proceeds to Step S18. On the other hand, if the system controller 4 determines that the request for reduction in the price of a registered plan voucher has not been received (NO in Step S17), the main process proceeds to Step S19.

In Step S18, the system controller 4 (the ticket voucher registration unit 41b) identifies, from the plan voucher database 24, which plan voucher indicates the plan ID included in the price reduction request received in Step S17, and reduces the stored price of the identified plan voucher. For example, the system controller (the ticket voucher registration unit 41b) updates the corresponding entry stored in the plan voucher database 24 with the charge obtained by subtracting a reduction in price from the charge indicated by the plan voucher identified from the plan voucher database 24 as a reduced charge. The main process then proceeds to Step S19. Alternatively, in place of the charge indicated by the plan voucher identified from the plan voucher database 24, the system controller 4 (the ticket voucher registration unit 41b) updates the corresponding entry stored in the plan voucher database 24 with a reduced charge included in the above price reduction request. The main process then proceeds to Step S19.

In Step S19, the system controller 4 determines whether a termination instruction has been issued. If the termination instruction has not been issued (NO in Step S19), the main process returns to Step S1. On the other hand, if the termination instruction has been issued (YES in Step S19), the process shown in FIG. 4 is terminated. In addition to the above processes, for example, a process not shown is performed when a change request except the price reduction request is received.

As described above, according to the above embodiment, when detecting a reduction in the price of an airline ticket included in an airline ticket and plan voucher combination that does not meet any set of desired purchase conditions specified by users, the set item providing server SA notifies information to prompt reduction in the price of a plan voucher included in a combination that fails to satisfy any set of desired purchase conditions that has no hits, among combinations of the marked-down airline ticket and a plan voucher, to the facility provider that provides the plan voucher. Thus, the set item providing server SA allows a facility provider to be timely prompted, in step with a reduction in the price of an airline ticket, to reduce the price of a plan voucher combined with the airline ticket. The reduction in the price of the airline ticket is a sign that demand for the ticket will decrease soon. The facility can reduce the price without missing this timing and thus can prevent the plan voucher from remaining unsold. This can appropriately control when to notify reduction in the price of the plan voucher.

The above embodiment has been described with an example where information to prompt price reduction is notified to, for example, the manager (facility provider) of an accommodation facility that provides accommodation plans. In addition to this, the present invention can also be applied to a case where information to prompt price reduction is notified to, for example, the manager of a golf facility that provides play plans for a golf course.

REFERENCE SIGNS LIST

1 communication unit
2 storage unit
3 input/output interface unit
4 system controller
AT1 airline terminal
FTm facility terminal
UTn user terminal
SA set item providing server
S set item providing system

The invention claimed is:

1. An information processing device comprising:
   at least one memory configured to store computer program code; and
   at least one processor configured to access said at least one memory and operate as instructed by said computer program code, said computer program code including:
   first registering code configured to cause at least one of said at least one processor to register a plurality of fare items each indicating at least a transportation fare in a first database in accordance with a registration request from a first terminal connected to the information processing device through a network, wherein the first terminal includes an airline terminal;
   second registering code configured to cause at least one of said at least one processor to register a plurality of facility items each indicating at least a facility plan charge in a second database in accordance with a registration request from a second terminal connected to the information processing device through the network, wherein the second terminal includes a facility terminal;
   obtaining code configured to cause at least one of said at least one processor to obtain sets of desired purchase conditions, each set indicating at least a budget specified by a user of a third terminal connected to the information processing device through the network, wherein the third terminal includes a user terminal;
   detecting code configured to cause at least one of said at least one processor to detect a reduction in a transportation fare indicated by a first item included in a combination of the first item registered in the first database and a second item registered in the second database that satisfies none of the sets of desired purchase conditions obtained, wherein the plurality of fare items includes the first item, and the plurality of facility items includes the second item;

identification code configured to cause at least one of said at least one processor to identify at least one active user based on: i) a search by the at least one active user within a predetermined time of a current time, and ii) a number of the at least one active user is less than or equal to an upper threshold value; and notification code configured to cause at least one of said at least one processor to automatically notify, via: i) an email sent to an email address, wherein the email address is stored in the second database in association with a facility identifier, or ii) a web page sent to the facility terminal, when a reduction in the transportation fare indicated by the first item is detected, information to prompt reduction in a charge indicated by the second item included in a combination that fails to satisfy any of the sets of desired purchase conditions, among combinations of the first item whose transportation fare has been reduced and the second item, to a provider of the second item, through the network, wherein the provider includes a facility operator, and wherein the information to prompt reduction in a charge is received by the facility operator in a timely manner to allow promotion of purchase of the combination by the at least one active user.

2. The information processing device according to claim 1, further comprising first identifying code configured to cause at least one of said at least one processor to identify, for each of a plurality of budget levels, how many users specified a budget indicated by one of the sets of desired purchase conditions, a combination of the first item whose transportation fare has been reduced and the second item failing to satisfy a budget indicated by any one of the sets of desired purchase conditions, wherein the notification code causes at least one of said at least one processor to notify information associating, for each budget level, a number of users identified with the budget level as the information to prompt reduction in the charge to the provider of the second item.

3. The information processing device according to claim 1, further comprising second identifying code configured to cause at least one of said at least one processor to identify how many users specified a budget indicated by one of the sets of desired purchase conditions more than once, a combination of the first item whose transportation fare has been reduced and the second item failing to satisfy a budget indicated by any one of the sets of desired purchase conditions, wherein the notification code is configured to cause at least one of said at least one processor to notify information associating, for each budget level, a number of users identified by the second identifying code with the budget level as the information to prompt reduction in the charge to the provider of the second item.

4. The information processing device according to claim 1, further comprising second identifying code configured to cause at least one of said at least one processor to identify how many users specified a budget indicated by one of the sets of desired purchase conditions a predetermined number of times or more within a predetermined period of time, a combination of the first item whose transportation fare has been reduced and the second item failing to satisfy a budget indicated by any one of the sets of desired purchase conditions, wherein the notification code is configured to cause at least one of said at least one processor to notify information associating, for each budget level, a number of users identified by the second identifying code with the budget level as the information to prompt reduction in the charge to the provider of the second item.

5. The information processing device according to claim 1, further comprising third identifying code configured to cause at least one of said at least one processor to identify how many users viewed an item provided by a specific provider, among users who specified a budget indicated by one of the sets of desired purchase conditions, a combination of the first item whose transportation fare has been reduced and the second item failing to satisfy a budget indicated by any one of the sets of desired purchase conditions, wherein the notification code is configured to cause at least one of said at least one processor to notify information associating, for each budget level, a number of users identified by the third identifying code with the budget level as the information to prompt reduction in the charge to the specific provider.

6. The information processing device according to claim 2, wherein the notification code is configured to cause at least one of said at least one processor to notify information associating, for each budget, the number of users identified by the first identifying code and a number of stocks of the first item included in a combination that fails to satisfy any of the sets of desired purchase conditions with the budget level as the information to prompt reduction in the charge to the provider of the second item.

7. The information processing device according to claim 2, wherein only when the number of users identified by the first identifying code is less than or equal to a threshold value, the notification code causes at least one of said at least one processor to notify the information to prompt reduction in the charge to the provider.

8. The information processing device according to claim 2, wherein only when an occupancy rate of the facility is less than or equal to a threshold value, the notification code causes at least one of said at least one processor to the information to prompt reduction in the charge to the provider.

9. The information processing device according to claim 2, wherein only when an occupancy rate of the facility is less than an occupancy rate of a competing provider, the notification code causes at least one of said at least one processor to notify the information to prompt reduction in the charge to the provider.

10. The information processing device according to claim 2, wherein only when a number of stocks of the first item included in a combination that fails to satisfy any of the sets of desired purchase conditions, among combinations of the first item whose transportation fare has been reduced and the second item, is less than or equal to a threshold value, the notification code causes at least one of said at least one processor to notify the information to prompt reduction in the charge to the provider.

11. An information processing method performed by a computer, the method comprising:

registering a plurality of fare items each indicating at least a transportation fare in a first database in accordance with a registration request from a first terminal connected to an information processing apparatus through a network, wherein the first terminal includes an airline terminal;

registering a plurality of facility items each indicating at least a facility plan charge in a second database in accordance with a registration request from a second terminal connected to the information processing apparatus through the network, wherein the second terminal includes a facility terminal;

obtaining sets of desired purchase conditions, each set indicating at least a budget specified by a user of a third terminal connected to the information processing apparatus through the network, wherein the third terminal includes a user terminal;

detecting a reduction in a transportation fare indicated by a first item included in a combination of a first item registered in the first database and a second item registered in the second database that satisfies none of the obtained sets of desired purchase conditions, wherein the plurality of fare items includes the first item, and the plurality of facility items includes the second item;

identifying at least one active user based on: i) a search by the at least one active user within a predetermined time of a current time, and ii) a number of the at least one active user is less than or equal to an upper threshold value;

automatically notifying via: i) an email sent to an email address, wherein the email address is stored in the second database in association with a facility identifier, or ii) a web page sent to the facility terminal, when a reduction in a transportation fare indicated by the first item is detected, information to prompt reduction in a charge indicated by the second item included in a combination that fails to satisfy any of the sets of desired purchase conditions, among combinations of the first item whose transportation fare has been reduced and the second item, to a provider of the second item, through the network, wherein the provider includes a facility operator, and wherein the information to prompt reduction in a charge is received by the facility operator in a timely manner to allow promotion of purchase of the combination by the at least one active user.

12. A non-transitory recording medium recording an information processing program for causing a computer to:

register a plurality of fare items each indicating at least a transportation fare in a first database in accordance with a registration request from a first terminal connected to an information processing apparatus through a network, wherein the first terminal includes an airline terminal;

register a plurality of facility items each indicating at least a facility plan charge in a second database in accordance with a registration request from a second terminal connected to the information processing apparatus through the network, wherein the second terminal includes a facility terminal;

obtain sets of desired purchase conditions, each set indicating at least a budget specified by a user of a third terminal connected to the information processing apparatus through the network, wherein the third terminal includes a user terminal;

detect a reduction in a transportation fare indicated by a first item included in a combination of the first item registered in the first database and a second item registered in the second database that satisfies none of the sets of desired purchase conditions obtained, wherein the plurality of fare items includes the first item, and the plurality of facility items includes the second item;

identify at least one active user based on: i) a search by the at least one active user within a predetermined time of a current time, and ii) a number of the at least one active user is less than or equal to an upper threshold value;

automatically notify via: i) an email sent to an email address, wherein the email address is stored in the second database in association with a facility identifier, or ii) a web page sent to the facility terminal, when a reduction in a transportation fare indicated by the first item is detected, information to prompt reduction in a charge indicated by the second item included in a combination that fails to satisfy any of the sets of desired purchase conditions, among combinations of the first item whose fare has been reduced and the second item, to a provider of the second item, through the network, wherein the provider includes a facility operator, and wherein the information to prompt reduction in a charge is received by the facility operator in a timely manner to allow promotion of purchase of the combination by the at least one active user.

* * * * *